March 24, 1942.  C. M. FREEMAN  2,277,311
SUN WATER HEATER
Filed May 24, 1940  2 Sheets-Sheet 2

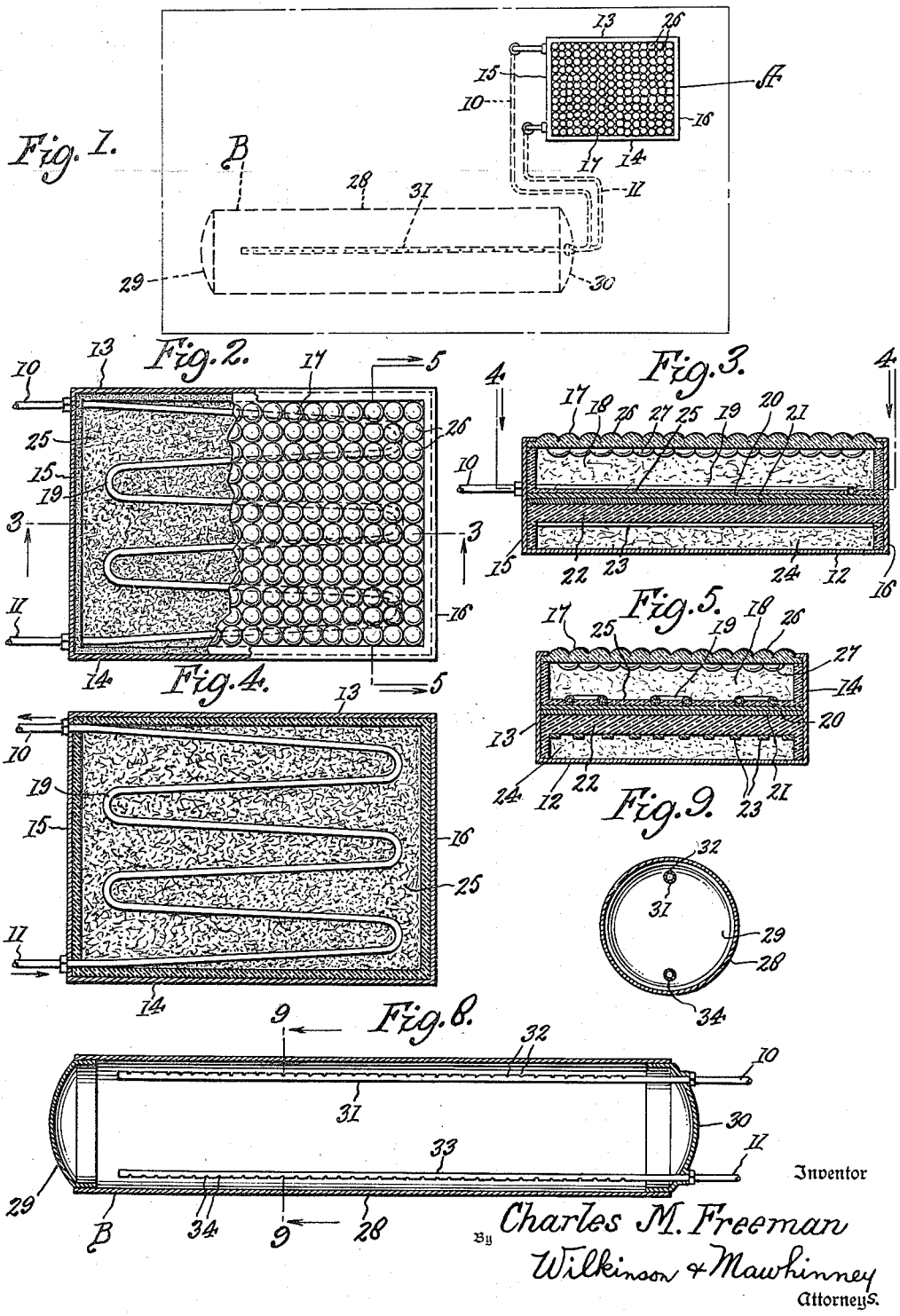

Inventor
Charles M. Freeman
By Wilkinson & Mawhinney
Attorneys

Patented Mar. 24, 1942

2,277,311

UNITED STATES PATENT OFFICE 2,277,311

SUN WATER HEATER

Charles M. Freeman, Manatee, Fla., assignor of one-half to D. B. Whittle, Palmetto, Fla.

Application May 24, 1940, Serial No. 337,063

6 Claims. (Cl. 126—271)

The present invention relates to improvements in sun water heaters, and more particularly relates to a domestic or other hot water storage system in which the heat rays of the sun are utilized in a novel form of heater to raise the temperature of the water to that high degree necessary for use in a system of this character.

A primary object of the invention is to utilize a lens construction which will pick up the sun's rays from various angles and concentrate and intensify the heat effect of the sun's rays by directing such rays upon a confined area for application to the water undergoing heat treatment to the end that the natural heat energy of the sun as applied to the heater will be multiplied by concentration of rays in a manner to establish high efficiency in the heater with comparatively small exposure area and comparatively small water capacity in the heater per se to nevertheless supply relatively large quantities of water to a relatively large storage tank whereby hot water in ample quantities will always be available for any household or other uses.

Another obect of the invention is to provide an improved form of lens in combination with a type of water containing coil in which the incoming sun's rays are initially condensed to concentrate the heat energy and thereafter suitably diffused into a large number of foci directed upon the convolutions of the water containing coils and also upon the heat-reflecting walls of the coil chamber, and if desirable upon certain heat absorbent material disposed in the chamber in and about the coil convolutions, such material being for the purpose of absorbing quantities of the heat energy during daylight hours, and acting in turn to yield up and give off this heat during the night or during periods of cloudy weather when the sun is obscured.

The invention also has for a further purpose an improved construction of heater unit resulting in a high insulating value to retain the residual heat in the heating chamber and in the water and in the heat absorbent material and in the conductive reflecting walls of the water heating chamber to avoid generally the dissipation of such heat and the consequent inefficiency of the heater; and in other words to promote the efficiency of the heater and to retain its absorbed heat.

A still further object of the invention is to provide an improved storage tank in which the supply of hot water and the drawing off of the cold water is accomplished in a novel manner and by a novel pipe arrangement whereby the strata of the hot and cold water will be kept separated throughout the entire length of a long tank to thereby avoid any rapid dissipation of the heat.

With the foregoing and other objects in view the invention will be described more particularly hereinafter and will be more particularly pointed out in the subjoined claims.

In the drawings, in which like parts are denoted by similar reference characters throughout the several views:

Figure 1 is a diagrammatic view showing an improved heater and connected water system constructed in accordance with the present invention.

Figure 2 is a top plan view, on an enlarged scale, of the improved heater unit with parts broken away and parts shown in section.

Figure 3 is a vertical longitudinal section taken on the line 3—3 in Figure 2.

Figure 4 is a horizontal section taken on the line 4—4 in Figure 3.

Figure 5 is a vertical transverse section taken on the line 5—5 in Figure 2.

Figure 8 is a longitudinal section taken through an improved water storage tank employed, and Figure 9 is a cross section taken on the line 9—9 in Figure 8.

Figure 6:
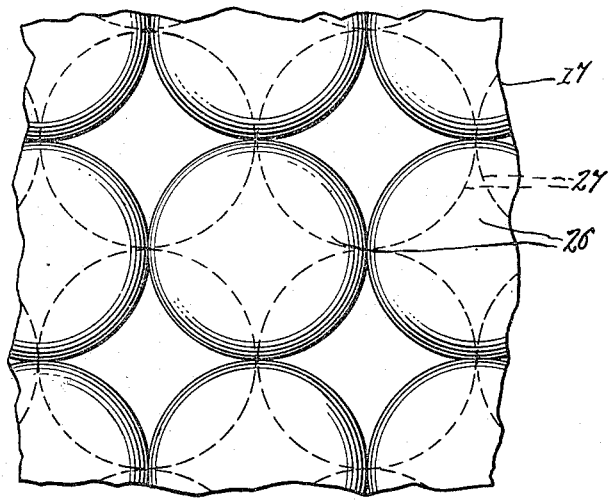
Figure 6 is a fragmentary plan view of the improved lens employed.

Referring more particularly to the drawings A represents the improved heating unit and B a water storage tank, the two elements being connected together by the pipes 10 and 11 of which 10 is the hot water pipe circulating the hot water from the heater A to the storage tank B, and 11 is the cold water pipe which circulates the cold water from the lower part of the storage tank B to the intake side of the heater A.

Referring more particularly to Figures 2 to 7 inclusive the improved heater unit comprises generally a container made up of a bottom 12, sides 13 and 14 and end walls 15 and 16. All of such walls may be insulated in any approved manner.

The top of the container receives in its upper part a lens 17 which is mounted therein in any appropriate manner. Such lens 17 encloses the heating chamber 18 in which is disposed the water coil 19 composed of an appropriate number of convolutions. The water coil at one end connects with the hot water pipe 10 and at the other end with the cold water pipe 11.

The coil 19 is supported upon a plate or sheet 20 of some heat retaining material preferably having good conductivity such as copper. Below the plate 20 is a metallic insulation 21 composed preferably of aluminium alloy. Beneath this sheet of aluminium alloy is a body 22 of non-metallic insulation such as rock wool, cork, Celotex or the like. This body 22 is supported upon metal strips or metal lathing 23. Below the insulation 22 is an air space 24 which may communicate with such insulation 22 through the strips or laths 23.

In the heating chamber 18 between the convolutions of the coil 19 is preferably placed suitable heat absorbent maerial, such for instance as catlinite or soapstone. This material 25 extends up from the plate 20 about half the height of the coil 19 so as to leave large surface areas of the convolutions of the coil 19 exposed to the heat rays.

The lens 17 is constructed of glass or other translucent material and is made with upper bulbs 26 and lower bulbs 27. The upper bulbs are convex on the upper faces to intercept directly the rays of the sun no matter what the inclination or the declination of that body may be. The bulbs 26 are in effect condensing lenses. They are numerous and of relatively small diameter. They act to collect and concentrate and to intensify the heat effect from the sun's rays and to direct the same across the intermediate flat portion of the glass lens plate 17 to the inner bulbs 27. These latter bulbs 27 are convex upon their lower faces and are diffusing lenses. They are also numerous and may be of the same diameter as the upper bulbs but they are offset relatively to the bulbs 26. In other words the bulbs 26 and 27 are not coaxial. Their axes are displaced relatively to one another.

Figure 7:
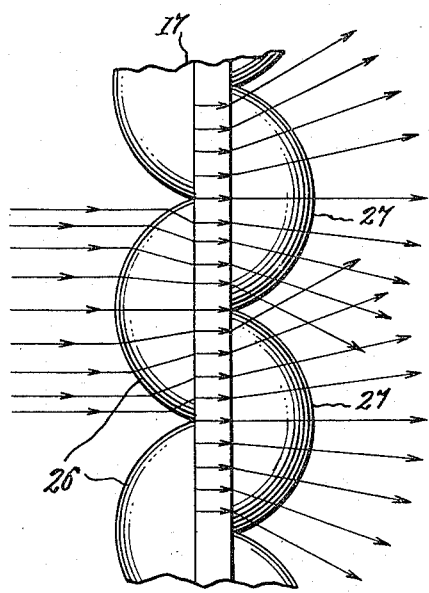
Figure 7 is a schematic view of the lens with the bulbs separated and indicating the condensing and diffusing effect upon the heat rays.

As best shown in Figures 6 and 7 the bulbs 26 and 27 are so arranged that the bulbs 27 have segments thereof overlapping with the circles of the upper bulbs 26. In the particular form of the invention herein illustrated as an example, segments of four such lower bulbs 27 overlap the circle of each upper bulb 26, except at the edges or marginal portions of the lens 17 where the continuity of the pattern is necessarily interrupted.

As indicated in Figure 7, the direction of the heat rays is shown as being changed upon entering the convex upper bulbs or lenses 26 to convergent lines to thereby concentrate the heat energy received in the heat rays from the sun. Due to the substantially flat character of the intermediate portion of the plate 17 the lenses 26 are plano-form interiorly as are also the upper surfaces of the lower bulbs or lenses 27. The concentrated and intensified sun's rays are intercepted and picked up by the lower bulbs 27 and diffused within the chamber 18, it being understood that the concentrated heat effect from a single upper bulb 26 is distributed to four underlying lower bulbs 27 and that therefore the diffusing value of four bulbs 27 is available to direct the concentrated energy from each upper bulb 26. Also each lower bulb 27 receives heat energy waves or rays from four of the upper bulbs 26. The net effect is to produce in the heating chamber 18 a multitude of focal heat points at the foci of the lower bulbs 27. The convolutions of the coil 19 are located at such foci as is also substantially the plate or sheet 20 and heat absorbent material 25 thereon.

Consequently heat, the effect of which is greatly intensified over that of the natural sun's rays at the point of interception, is directed upon the water within the coil 19 and upon the absorbent material 25 so that a high degree of heat will be conveyed to the water in coil 19 during periods of sunshine which heat is substantially radiant heat from the sun. Moreover through the conductivity of the metal walls of the coil 19 the plate 20 will receive a high degree of heat which it will conduct back to the coil 19 and the water therein. Moreover the heat absorbent material 25 will absorb a great amount of this heat during periods of sunshine, which heat will be given off durig obscuration periods of the sun. The high degree of heat referred to is a high degree relatively to external atmospheric temperature. This atmospheric temperature naturally varies widely for various points on the earth relatively to the changing position of the sun at various seasons of the year. Therefore the atmospheric temperature and the radiant heat rays from the sun will differ widely dependent upon location and time both of the day and of the season. The improved device greatly intensifies and magnifies the effect of the normal radiant heat of the sun's rays. Actual tests made in September 1940 in Manatee, Florida, under an outside temperature of 85° F. showed an increase in water temperature up to 201° F.

The construction of the insulation will hold this heat in the heat absorbent material 25 over long periods of time. The coil 19 preferably slopes slightly from one end 11 to the higher end 10 which may be accomplished by inclining the plate 20 very slightly in the container.

The lens employed herein is somewhat similar to that used for light reflecting purposes in the Patent No. 1,649,708, granted November 15, 1927, to Elmer R. Large and Charles M. Freeman.

Referring more particularly to Figures 8 and 9 the storage tank B is shown to be formed of a substantially cylindrical wall 28 and end heads 29 and 30. Unlike ordinary storage tanks which are upended, this tank is laid with its axis substantially horizontal so that its length is horizontal and it has a relatively small vertical dimension.

The hot water pipe 10 has a long extension 31 lying substantially horizontally throughout the major length of the tank. A great number of relatively small perforations 32 are made in the pipe extension 31. These perforations are preferably in a single line. All perforations have their axis substantially vertical. The perforations open upwardly toward the round roof of the cylindrical tank 28 and are spaced from such roof.

The cold water pipe 11 has an extension 33 lying substantially horizontally and substantially throughout the length of the tank near the bottom thereof. A line of minute perforations 34 extends downwardly from the pipe 33 toward the rounded bottom of the tank but spaced therefrom.

Hot water entering by way of pipe 10 and its extension 31 issues upwardly in small streams from the numerous perforations 32 toward the round roof. Thus the hot water enters quietly at many points throughout the long horizontal length of the tank and is diverted quietly by the rounded roof down in opposite directions in the body of liquid in the tank. The cold water in the same way is drawn quietly through the numerous perforations 34 all forming individual outlets into the cold water pipe 11, and the cold water being guided downwardly to such numerous outlets 34 by the round bottom portion of the tank. Thus the liquid body in the tank is kept in a relatively quiescent state without that agitation which would unduly tend to admix the cold with the hot water and thus dissipate the heat of the tank. The arrangement also tends to maintain the stratum of hot water in the upper portion of the tank, this stratum being maintainable in a very large body due to the horizontal elongation of the tank. The arrangement contributes to the efficiency of the storage tank and avoids undue drop in temperature.

The coil 19 is preferably made with relatively few convolutions. Due to the nature of the lens 17 few convolutions are all that is necessary to the highest efficiency. More convolutions only contribute to the complexity and expense of a heater and also cause slower circulation and therefore the storage tank is apt to be exhausted of hot water in a shorter space of time than where fewer coils are used. Of course only relatively few of the foci of the lower bulbs 27 impinge directly upon the few convolutions of coil 19 but due to the arrangement of the bulbs 26 and 27 the action is adequate, particularly when assisted by the heat conduction of the plate 20 and the heat given off by the heat absorbent material 25 when such material is used.

It is obvious that various changes and modifications may be made in the details of construction and design of the above specifically described embodiment of this invention without departing from the spirit thereof, such changes and modifications being restricted only by the scope of the following claims.

What is claimed is:

1. In a sun water heater, a heating unit comprising a container having a bottom, sides and ends, a transparent lens fitted in the top of said container and having upper and lower bulbs thereon for intercepting, concentrating and diffusing the rays from the sun into said container, a heat absorbing metallic plate in said container spaced substantially above the bottom thereof but spaced below said lens and forming between said lens and said plate a heating chamber, a water coil in said chamber spaced below said lens, an aluminum alloy insulation sheet directly below said plate, and non-metallic insulation below said aluminum alloy insulation, the bottom of said container and said body of non-metallic insulation being spaced apart to provide an insulating air space therebetween.

2. In a sun water heater, a heating unit comprising a heating chamber, a water coil in said chamber, and a lens exposed to the sun's rays and extending over said chamber and the coil therein, said lens having condensing bulbs on the upper surface thereof for intercepting the sun's rays at all angles of inclination made by the sun in its diurnal passage, and diffusing bulbs on the lower surface of said lens for receiving and diffusing the concentrated rays received from the external condensing bulbs, and said water coil having convolutions located to receive heat rays directed thereon by the diffusing bulbs of said lens.

3. In a sun water heater, a heating unit comprising a heating chamber, a water coil in said chamber having convolutions, a plate backing said coil and having high heat conductive and heat radiating properties, a lens over the coil in the chamber, said lens comprising external condensing bulbs exposed to the sun for intercepting the sun's rays, and inner diffusing bulbs exposed to the coil and to said plate and serving to direct the intercepted sun's rays and diffuse them upon the convolutions of said coil and to said plate.

4. In a sun water heater, a heating unit comprising a heating chamber, a water coil located in said chamber, a lens in said chamber above the water coil comprising upper external condensing bulbs exposed to the rays of the sun, and inner diffusing bulbs spaced from said coil, the inner and outer bulbs being relatively offset.

5. In a sun water heater, a heating unit comprising a chamber, a water coil in said chamber, a lens in the chamber above the coil comprising inner and outer bulbs, said outer bulbs being condensing bulbs exposed to the sun's rays for condensing and concentrating the same, said inner bulbs being diffusing bulbs for diffusing the concentrated rays from said outer bulbs, said inner and outer bulbs being offset axially from one another, the marginal portions of a plurality of said inner bulbs overlapping each of said outer bulbs.

6. In a sun water heater, a heating unit comprising a heating chamber, a heat conducting plate, a water coil disposed on said plate, heat absorbent material on the plate between the convolutions of the coil, and a lens in the chamber above the plate having condensing and diffusing portions for intercepting and concentrating the sun's rays and diffusing said rays upon the coil and the interposed absorbent material.

CHARLES M. FREEMAN.